US012684262B2

(12) United States Patent
Park et al.

(10) Patent No.: US 12,684,262 B2
(45) Date of Patent: Jul. 14, 2026

(54) IMAGE SENSOR

(71) Applicant: SK hynix Inc., Gyeonggi-do (KR)

(72) Inventors: Yu Jin Park, Gyeonggi-do (KR); Jeong Eun Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 408 days.

(21) Appl. No.: 18/295,271

(22) Filed: Apr. 4, 2023

(65) Prior Publication Data

US 2024/0107193 A1 Mar. 28, 2024

(30) Foreign Application Priority Data

Sep. 16, 2022 (KR) ......................... 10-2022-0117101

(51) Int. Cl.
| | |
|---|---|
| *H04N 25/709* | (2023.01) |
| *H04N 25/60* | (2023.01) |
| *H04N 25/78* | (2023.01) |

(52) U.S. Cl.
CPC ........... *H04N 25/709* (2023.01); *H04N 25/60* (2023.01); *H04N 25/78* (2023.01)

(58) Field of Classification Search
CPC ...... H04N 25/709; H04N 25/60; H04N 25/78; H04N 25/766; H04N 25/75; H04N 25/771
See application file for complete search history.

(56) References Cited

U.S. PATENT DOCUMENTS

| | | | |
|---|---|---|---|
| 2007/0165464 A1* | 7/2007 | Yang ......................... | G11C 5/14 |
| | | | 365/191 |
| 2012/0043454 A1 | 2/2012 | Sakuragi | |
| 2020/0280693 A1* | 9/2020 | Kim ......................... | H04N 25/00 |
| 2021/0185256 A1* | 6/2021 | Yamashita .............. | H03M 1/56 |

OTHER PUBLICATIONS

Tri-State Buffers in VHDL (Year: 2013).*

* cited by examiner

*Primary Examiner* — Twyler L Haskins
*Assistant Examiner* — Surafel Yilmakassaye
(74) *Attorney, Agent, or Firm* — IP & T GROUP LLP

(57) ABSTRACT

Disclosed is an image sensor including a buffer circuit suitable for generating, based on at least one first signal, at least one second signal controlled during each of settling and comparison periods, a comparison circuit suitable for using an operating current having a relatively high level during the settling period and a relatively low level during the comparison period based on the second signal, and comparing a pixel signal with a ramp signal during the comparison period to generate a comparison signal.

15 Claims, 7 Drawing Sheets

IMAGE SENSOR

CROSS-REFERENCE TO RELATED APPLICATION(S)

This application claims priority under 35 U.S.C. § 119 to Korean Patent Application No. 10-2022-0117101, filed on Sep. 16, 2022, the disclosure of which is incorporated herein by reference in its entirety.

BACKGROUND

1. Field

Various embodiments of the present disclosure relate to a semiconductor design technique, and more particularly, to an image sensor.

2. Description of the Related Art

Image sensors are devices for capturing images using the property of a semiconductor which reacts to light. Image sensors may be classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

SUMMARY

Various embodiments of the present disclosure are directed to an image sensor capable of supporting a high-speed mode and a low-power mode when converting a pixel signal.

In accordance with an embodiment of the present disclosure, an image sensor may include a buffer circuit suitable for generating, based on at least one first signal, at least one second signal controlled during each of settling and comparison periods; and a comparison circuit suitable for using an operating current having a relatively high level during the settling period and a relatively low level during the comparison period based on the second signal, and comparing a pixel signal with a ramp signal during the comparison period to generate a comparison signal.

In accordance with an embodiment of the present disclosure, an image sensor may include a comparison circuit suitable for comparing, based on a bias signal, a pixel signal with a ramp signal and outputting a comparison signal; and a noise suppression circuit connected to an output terminal of the comparison signal, and suitable for suppressing noise, which is applied to the comparison signal during a specific period, based on a suppression control signal.

In accordance with an embodiment of the present disclosure, an image sensor may include a pixel array suitable for generating a plurality of pixel signals; a ramp signal generator suitable for generating a ramp signal; a bias generator suitable for generating at least one bias voltage; and a readout circuit including: a plurality of buffers suitable for generating a plurality of bias signals and a plurality of suppression control signals based on the at least one bias voltage; and a plurality of signal converters suitable for operating in a high-speed mode during a settling period and in a low-power mode during a comparison period based on the plurality of bias signals and the plurality of suppression control signals, and generating a plurality of converted signals based on the plurality of pixel signals and the ramp signal during the comparison period.

In accordance with an embodiment of the present disclosure, an image sensor may include a first comparison circuit configured to compare, according to a first control signal and during a comparison period, a pixel signal with a ramp signal to generate a first comparison signal in a lower power mode than a settling period; a low pass filter circuit configured to low-pass-filter, during the comparison period, the first comparison signal based on a second control signal; a second comparison circuit configured to compare the low-pass-filtered first comparison signal with a reference signal to generate a second comparison signal; a count circuit operable according to an enable signal and configured to generate a converted signal based on the second comparison signal and a clock; and a delay circuit configured to delay the second control signal by a time amount to generate the enable signal, the time amount depending on difference in bandwidths of the first comparison signal before and after the low-pass-filtering.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
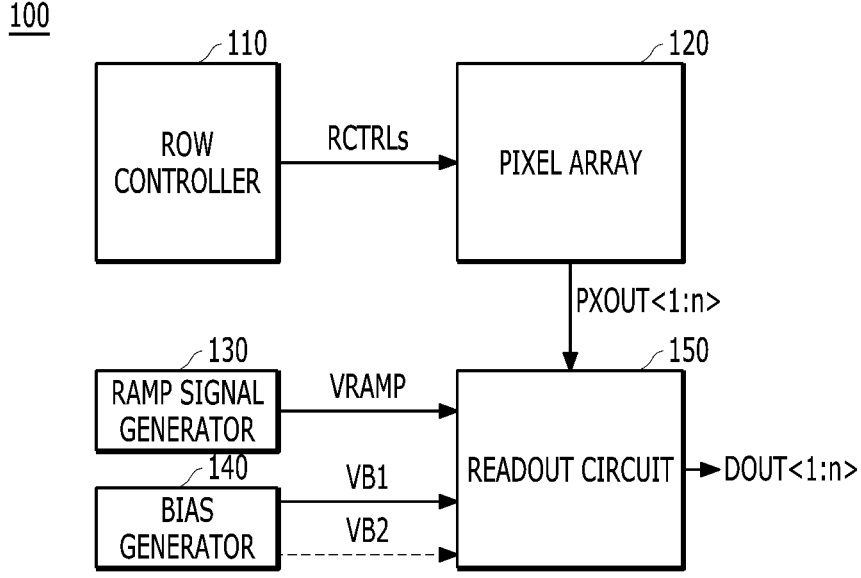
FIG. 1 is a block diagram illustrating an image sensor in accordance with an embodiment of the present disclosure.

FIG. 1 is a block diagram illustrating an image sensor 100 in accordance with an embodiment of the present disclosure.

Referring to FIG. 1, the image sensor 100 may include a row controller 110, a pixel array 120, a ramp signal generator 130, a bias generator 140 and a readout circuit 150.

The row controller 110 may generate row control signals RCTRLs for controlling the pixel array 120 for each row. For example, the row controller 110 may generate first row control signals for controlling pixels arranged in a first row of the pixel array 120, and generate $y^{th}$ row control signals for controlling pixels arranged in an $y^{th}$ row of the pixel array 120, where "y" is a natural number greater than 2. The row control signals RCTRLs may include the first to $y^{th}$ row control signals.

The pixel array 120 may include a plurality of pixels (not illustrated) arranged at intersections of a plurality of rows and a plurality of columns. The plurality of pixels may output a plurality of source pixel signals PXOUT<1:n> through a plurality of column lines for each row on the basis of the row control signals RCTRLs, where "n" is a natural number greater than 2. For example, the pixels arranged in the first row among the plurality of pixels may generate the plurality of source pixel signals PXOUT<1:n> for a first unit row time on the basis of the first row control signals, and the pixels arranged in the $y^{th}$ row among the plurality of pixels may generate the plurality of source pixel signals PXOUT<1:n> for an $y^{th}$ unit row time on the basis of the $y^{th}$ row control signals.

The ramp signal generator 130 may generate a source ramp signal VRAMP. For example, the source ramp signal VRAMP may ramp in a predetermined pattern, and be repeatedly generated for each unit row time.

The bias generator 140 may generate at least one bias voltage. According to an example, the bias generator 140 may generate a first bias voltage VB1 (refer to FIG. 4). According to another example, the bias generator 140 may generate the first bias voltage VB1 and a second bias voltage VB2 (refer to FIG. 5).

The readout circuit 150 may generate a plurality of converted signals DOUT<1:n>, which correspond to the plurality of source pixel signals PXOUT<1:n>, on the basis of the at least one bias voltage, the source ramp signal VRAMP and the plurality of source pixel signals PXOUT<1:n>. Each of the plurality of source pixel signals PXOUT<1:n> may be an analog signal, and each of the plurality of converted signals DOUT<1:n> may be a digital signal. The at least one bias voltage may be the first bias voltage VB1. However, this is merely an example, and the present disclosure is not limited thereto. The at least one bias voltage may be the first bias voltage VB1 and the second bias voltage VB2.

Figure 2:
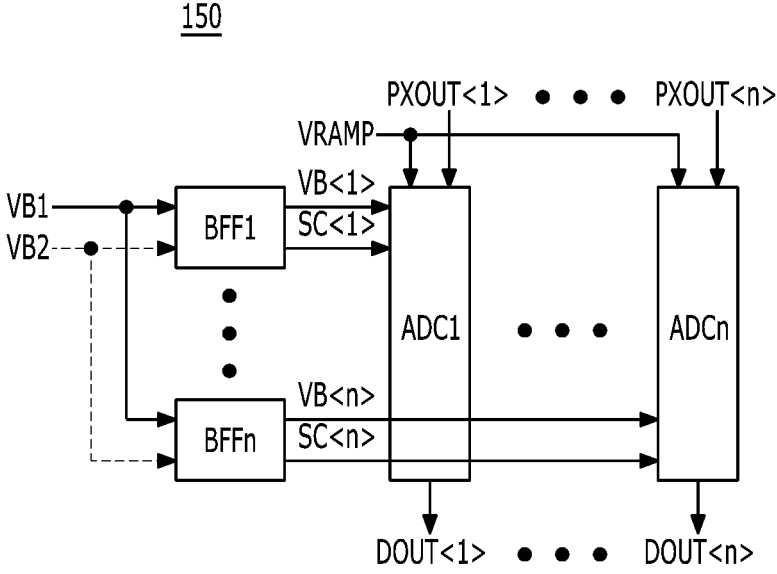
FIG. 2 is a block diagram illustrating a readout circuit illustrated in FIG. 1 in accordance with an embodiment of the present disclosure.

FIG. 2 is a block diagram illustrating the readout circuit 150 illustrated in FIG. 1 in accordance with an embodiment of the present disclosure.

Referring to FIG. 2, the readout circuit 150 may include a plurality of buffers BFF1 to BFFn and a plurality of signal converters ADC1 to ADCn. For example, the plurality of signal converters ADC1 to ADCn may be configured to respectively correspond to the plurality of source pixel signals PXOUT<1:n>, and the plurality of buffers BFF1 to BFFn may be configured to respectively correspond to the plurality of signal converters ADC1 to ADCn.

The plurality of buffers BFF1 to BFFn may include respective buffer circuits that generate a plurality of bias signals VB<1:n> and a plurality of suppression control signals SC<1:n>, which are controlled in correspondence to a settling period and a comparison period, on the basis of the at least one bias voltage. For example, the plurality of buffers BFF1 to BFFn may generate the respective bias signals VB<1:n> and the respective suppression control signals SC<1:n>, which are controlled in correspondence to the settling period and the comparison period, on the basis of the first bias voltage VB1 or the first bias voltage VB1 and the second bias voltage VB2. The settling period may be a period in which a voltage level of a ramp signal VR is adjusted and maintained at a preset start level, and the comparison period may be a period in which the ramp signal VR is compared with each of the plurality of pixel signals (e.g., P<1>) (refer to FIG. 6).

The plurality of signal converters ADC1 to ADCn may operate in a high-speed mode during the settling period and operate in a low-power mode during the comparison period, on the basis of the respective bias signals VB<1:n> and the respective suppression control signals SC<1:n>. The plurality of signal converters ADC1 to ADCn may adjust and maintain a voltage level of the ramp signal VR at the start level during the settling period, and generate the plurality of converted signals DOUT<1:n>, respectively, on the basis of the respective source pixel signals PXOUT<1:n> and the source ramp signal VRAMP during the comparison period. For example, each of the plurality of signal converters ADC1 to ADCn may include an analog to digital converter.

Since the plurality of signal converters ADC1 to ADCn may be designed to be identical to one another, the first signal converter ADC1 is representatively described below. For example, the first signal converter ADC1 may receive a corresponding first bias signal VB<1> among the plurality of bias signals VB<1:n>, a corresponding first suppression control signal SC<1> among the plurality of suppression control signals SC<1:n> and a corresponding first source pixel signal PXOUT<1> among the plurality of source pixel signals PXOUT<1:n>, and output a corresponding first converted signal DOUT<1> among the plurality of converted signals DOUT<1:n>.

Figure 3:
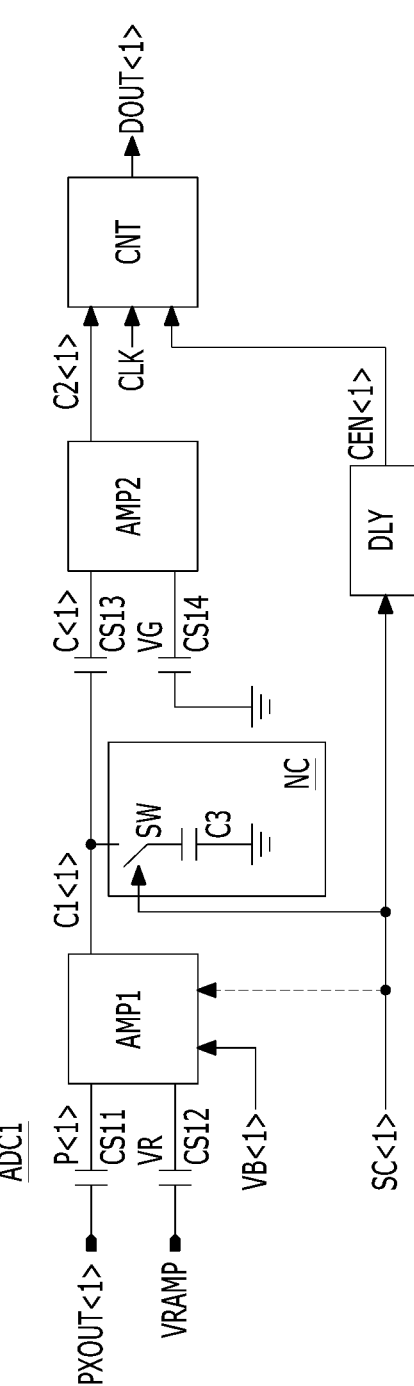
FIG. 3 is a block diagram illustrating a first signal converter illustrated in FIG. 2 in accordance with an embodiment of the present disclosure.

FIG. 3 is a block diagram illustrating the first signal converter ADC1 illustrated in FIG. 2 in accordance with an embodiment of the present disclosure.

Referring to FIG. 3, the first signal converter ADC1 may include a first sampling circuit CS11, a second sampling circuit CS12, a first comparison circuit AMP1, a noise suppression circuit NC, a third sampling circuit CS13, a fourth sampling circuit CS14, a second comparison circuit AMP2, a count circuit CNT and a delay circuit DLY.

The first sampling circuit CS11 may be connected between an output terminal of the first source pixel signal PXOUT<1> and a first input terminal of the first comparison circuit AMP1. The first sampling circuit CS11 may transfer a first pixel signal P<1>, which corresponds to a voltage level of the first source pixel signal PXOUT<1>, to the first input terminal of the first comparison circuit AMP1. For example, the first sampling circuit CS11 may include a capacitor.

The second sampling circuit CS12 may be connected between an output terminal of the source ramp signal VRAMP and a second input terminal of the first comparison circuit AMP1. The second sampling circuit CS12 may transfer the ramp signal VR, which corresponds to a voltage level of the source ramp signal VRAMP, to the second input terminal of the first comparison circuit AMP1. For example, the second sampling circuit CS12 may include a capacitor.

The first comparison circuit AMP1 may be connected between the first and second input terminals and an output terminal of a first comparison signal C1<1>. According to an example, the first comparison circuit AMP1 may use an operating current having a relatively high level according to the high-speed mode during the settling period, and use the operating current having a relatively low level according to the low-power mode during the comparison period, on the basis of the first bias signal VB<1>. According to another example, the first comparison circuit AMP1 may use the operating current having a relatively high level according to the high-speed mode during the settling period, and use the operating current having a relatively low level according to the low-power mode during the comparison period, on the basis of the first bias signal VB<1> and the first suppression control signal SC<1>.

The first comparison circuit AMP1 may rapidly settle a voltage level of the first comparison signal C1<1> to a target level by using the operating current having the high level during the settling period, and operate with low power by using the operating current having the low level during the comparison period. The first comparison circuit AMP1 may reduce noise introduced through the first and second input terminals (hereinafter referred to as "input noise") and increase noise of the first comparison circuit AMP1 (hereinafter referred to as "output noise") by operating with the low power. The reason why the output noise increases is that thermal noise of transistors included in the first comparison circuit AMP1 increases due to the low power. The first comparison circuit AMP1 may compare the first pixel signal P<1> with the ramp signal VR and generate the first comparison signal C1<1> during the comparison period. The output noise may be reflected in the first comparison signal C1<1>.

The noise suppression circuit NC may be connected to the output terminal of the first comparison signal C1<1>. The noise suppression circuit NC may be disabled during the settling period and enabled during the comparison period on the basis of the first suppressor control signal SC<1>. The noise suppression circuit NC may suppress the output noise, which is reflected in or applied to the first comparison signal C1<1> during the comparison period, on the basis of the first suppression control signal SC<1>. The noise suppression circuit NC may serve as a low pass filter that filters the output noise having a relatively high frequency does not pass therethrough. That is, the noise suppression circuit NC may suppress the output noise by reducing the bandwidth of the first comparison circuit AMP1.

For example, the noise suppression circuit NC may include a switch SW1 and a capacitor CC1. The switch SW1 may be connected to the output terminal of the first comparison signal C1<1>. The switch SW1 may switch based on the first suppression control signal SC<1>. For example, the switch SW1 may be open during the settling period and be shorted during the comparison period. The capacitor CC1 may be connected between the switch SW1 and a supply terminal of a low voltage. Referring to FIG. 3, the supply terminal of the low voltage is illustrated as a supply terminal of a ground voltage, but this is merely an embodiment, and the present disclosure is not limited thereto. The supply terminal of the low voltage may be a supply terminal of a power source voltage, for example, VSS, having a predetermined size.

The third sampling circuit CS13 may be connected between the output terminal of the first comparison signal C1<1> and a first input terminal of the second comparison circuit AMP2. The third sampling circuit CS13 may transfer a comparison signal C<1>, which corresponds to the voltage level of the first comparison signal C1<1>, to the first input terminal of the second comparison circuit AMP2. For example, the third sampling circuit CS13 may include a capacitor.

The fourth sampling circuit CS14 may be connected between the supply terminal of the low voltage and a second input terminal of the second comparison circuit AMP2. The fourth sampling circuit CS14 may generate and maintain a reference signal VG at the second input terminal of the second comparison circuit AMP2. For example, the fourth sampling circuit CS14 may include a capacitor.

The second comparison circuit AMP2 may be connected between the first and second input terminals of the second comparison circuit AMP2 and an output terminal of a second comparison signal C2<1>. The second comparison circuit AMP2 may compare the comparison signal C<1> with the reference signal VG and generate the second comparison signal C2<1>.

The count circuit CNT may generate the first converted signal DOUT<1> on the basis of the second comparison signal C2<1>, a clock signal CLK and a first count enable signal CEN<1>.

The delay circuit DLY may delay the first suppression control signal SC<1> by a predetermined delay time D (refer to FIG. 6) and generate the first count enable signal CEN<1>. Since the first comparison signal C1<1> may be delayed as the bandwidth of the first comparison circuit AMP1 is reduced, the delay circuit DLY may delay the first count enable signal CEN<1> by the delay time D for which the first comparison signal C1<1> is delayed. Although the embodiment of the present disclosure has been described as an example that the delay circuit DLY delays the first suppression control signal SC<1> and generates the first count enable signal CEN<1>, the present disclosure is not necessarily limited thereto, and the delay circuit DLY may delay a source control signal LP, which is to be described below, and generate the first count enable signal CEN<1>.

Figure 4:
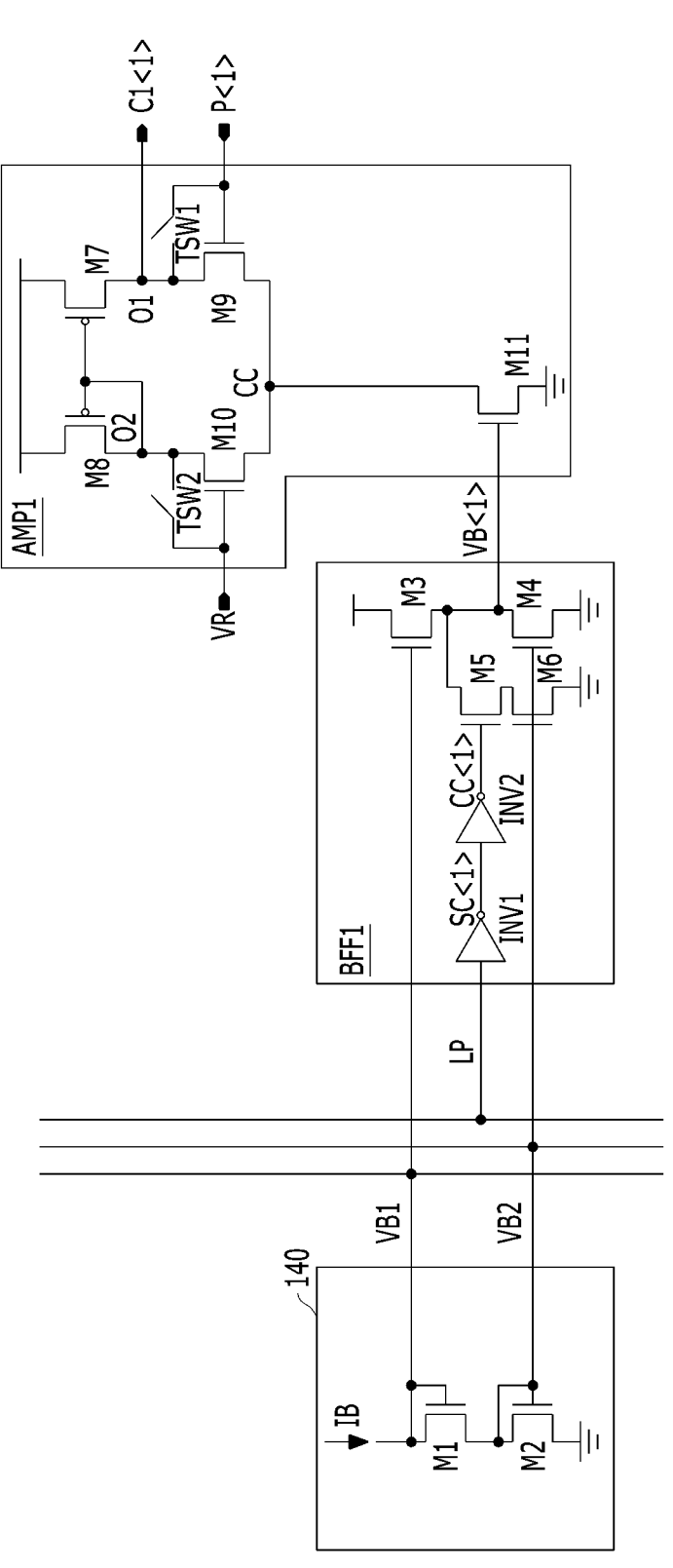
FIG. 4 is a circuit diagram illustrating an example of a bias generator illustrated in FIG. 1, a first buffer illustrated in FIG. 2 and a first comparison circuit illustrated in FIG. 3 in accordance with an embodiment of the present disclosure.

FIG. 4 is a circuit diagram illustrating an example of the bias generator 140 illustrated in FIG. 1, the first buffer BFF1 illustrated in FIG. 2 and the first comparison circuit AMP1 illustrated in FIG. 3 in accordance with an embodiment of the present disclosure.

The bias generator 140 may include a first bias voltage generation circuit M1 and a second bias voltage generation circuit M2.

The first bias voltage generation circuit M1 may generate the first bias voltage VB1 corresponding to a bias current IB. For example, the first bias voltage generation circuit M1 may include an NMOS transistor having a source terminal and a drain terminal connected between an input node of the bias current IB and the second bias voltage generation circuit M2 and a gate terminal, the drain terminal and gate terminal being connected to an output terminal of the first bias voltage VB1.

The second bias voltage generation circuit M2 may generate the second bias voltage VB2 corresponding to the bias current IB. For example, the second bias voltage generation circuit M2 may include an NMOS transistor having a source terminal and a drain terminal connected between the first bias voltage generation circuit M1 and the supply terminal of the low voltage and a gate terminal, the drain terminal and gate terminal being connected to an output terminal of the second bias voltage VB2.

The first buffer BFF1 may receive the first bias voltage VB1, the second bias voltage VB2 and the source control signal LP, which are global signals. The first buffer BFF1 may be designed as an isolation buffer to prevent a coupling effect with the other buffers BFF2 to BFFn (refer to FIG. 2). For example, the buffer circuit included in the first buffer BFF1 may include a first driver M3, a second driver M4, a first inverter INV1, a second inverter INV2, a third driver M5 and a fourth driver M6. However, this is merely an embodiment, and the present disclosure may not be limited thereto. The configuration of the buffer circuit may vary as necessary.

The first driver M3 may be connected between a supply terminal of a high voltage, for example, VDD, and an output terminal of the first bias signal VB<1>. The first driver M3 may receive the first bias voltage VB1, and drive the output terminal of the first bias signal VB<1> with the high voltage according to the first bias voltage VB1.

The second driver M4 may be connected between the output terminal of the first bias signal VB<1> and the supply terminal of the low voltage, for example, VSS. The second driver M4 may receive the second bias voltage VB2, and drive the output terminal of the first bias signal VB<1> with the low voltage according to the second bias voltage VB2.

The first inverter INV1 may invert the source control signal LP and generate the first suppression control signal SC<1>.

The second inverter INV2 may invert the first suppression control signal SC<1> and generate a first driving control signal CC<1>.

The third driver M5 may be connected between the output terminal of the first bias signal VB<1> and the fourth driver M6. The third driver M5 may receive the first driving control signal CC<1>, and adjust a voltage level of the first bias signal VB<1> according to the first driving control signal CC<1>. When the first driving control signal CC<1> has a logic high level, i.e., "1", the third driver M5 may increase a current flowing through the first driver M3, and decrease the voltage level of the first bias signal VB<1>. Accordingly, the operating current flowing through a current sinking element M11 of the first comparison circuit AMP1 may decrease. Conversely, when the first driving control signal CC<1> has a logic low level, i.e., "0", the third driver M5 may decrease the current flowing through the first driver M3, and increase the voltage level of the first bias signal VB<1>. Accordingly, the operating current flowing through the current sinking element M11 of the first comparison circuit AMP1 may increase.

The fourth driver M6 may be connected between the third driver M5 and the supply terminal of the low voltage. The fourth driver M6 may receive the second bias voltage VB2.

Although an embodiment of the present disclosure has been described as an example that the buffer circuit includes one third driver M5 and one fourth driver M6, the present disclosure is not necessarily limited thereto, and the buffer circuit may include a plurality of third drivers M5 and a plurality of fourth drivers M6. In this case, the operating current may be finely and variously adjusted in an embodiment of the present disclosure. The source control signal LP may be designed to have a plurality of bits to control the plurality of third drivers M5.

The first comparison circuit AMP1 may include a first current source element M7, a second current source element M8, a first input element M9, a second input element M10, a first switch element TSW1, a second switch element TSW2 and the current sinking element M11.

The first current source element M7 may be connected between the supply terminal of the high voltage and an output terminal O1 of the first comparison signal C1<1>. For example, the first current source element M7 may include a PMOS transistor having a gate terminal connected to an inverting output terminal O2 and a source terminal and a drain terminal connected between the supply terminal of the high voltage and the output terminal O1 of the first comparison signal C1<1>.

The second current source element M8 may be connected between the supply terminal of the high voltage and the inverting output terminal O2. For example, the second current source element M8 may include a PMOS transistor having a gate terminal connected to the inverting output terminal O2 and a source terminal and a drain terminal connected between the supply terminal of the high voltage and the inverting output terminal O2.

The first input element M9 may be connected between the output terminal O1 and a common node CC. For example, the first input element M9 may include an NMOS transistor a gate terminal receiving the first pixel signal P<1> and a source terminal and a drain terminal connected between the output terminal O1 and the common node CC.

The second input element M10 may be connected between the inverting output terminal O2 and the common node CC. For example, the second input element M10 may include an NMOS transistor having a gate terminal receiving the ramp signal VR and a source terminal and a drain terminal connected between the inverting output terminal O2 and the common node CC.

The first switch element TSW1 may be connected between an input terminal of the first pixel signal P<1> and the output terminal O1. For example, the first switch element TSW1 may be shorted during an auto-zero period, and be open during the settling period and the comparison period.

The second switch element TSW2 may be connected between an input terminal of the ramp signal VR and the inverting output terminal O2. For example, the second switch element TSW2 may be shorted during the auto-zero period, and be open during the settling period and the comparison period.

The current sinking element M11 may be connected between the common node CC and the supply terminal of the low voltage. The current sinking element M11 may receive the first bias signal VB<1>, and generate the operating current corresponding to the first bias signal VB<1>. For example, the current sinking element M11 may include an NMOS transistor having a gate terminal connected to the output terminal of the first bias signal VB<1> and a source terminal and a drain terminal connected between the common node CC and the supply terminal of the low voltage.

Figure 5:
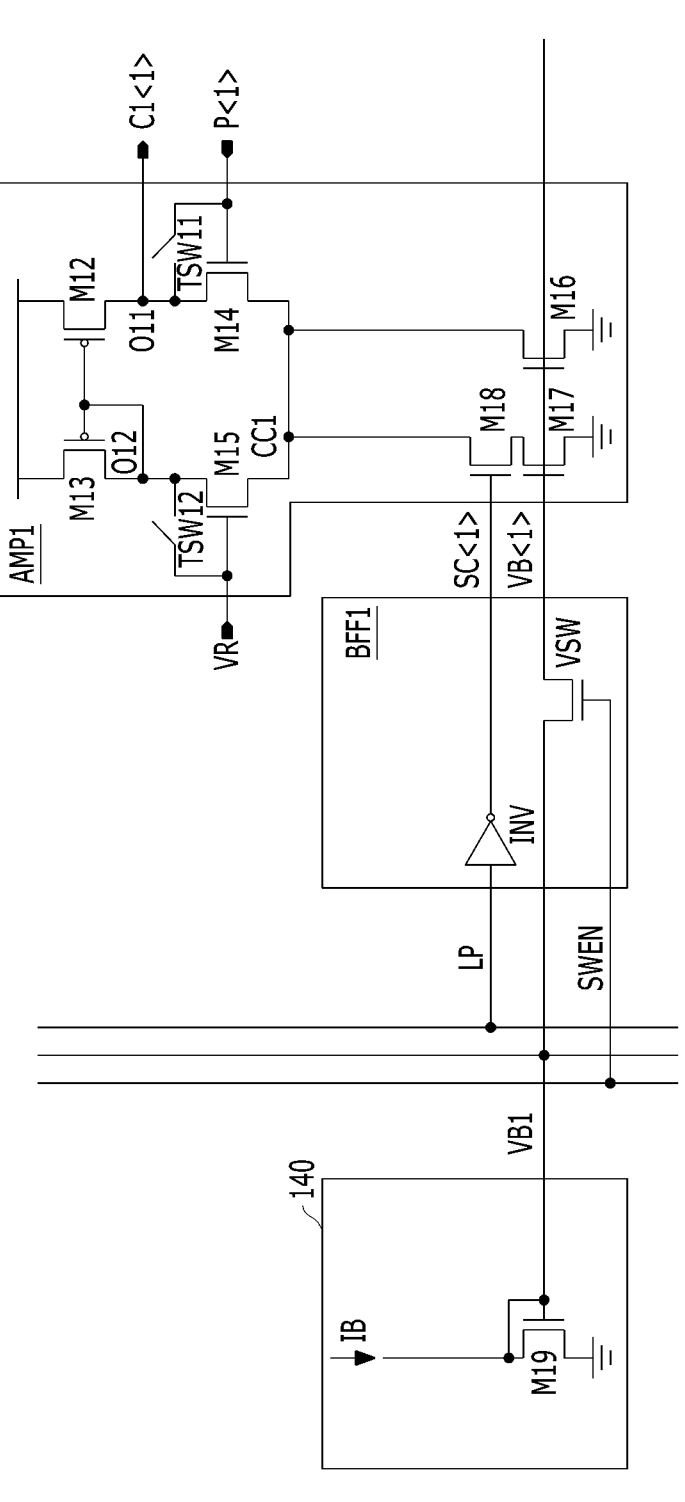
FIG. 5 is a circuit diagram illustrating another example of the bias generator illustrated in FIG. 1, the first buffer illustrated in FIG. 2 and the first comparison circuit illustrated in FIG. 3 in accordance with an embodiment of the present disclosure.

FIG. 5 is a circuit diagram illustrating another example of the bias generator 140 illustrated in FIG. 1, the first buffer BFF1 illustrated in FIG. 2 and the first comparison circuit AMP1 illustrated in FIG. 3 in accordance with an embodiment of the present disclosure.

The bias generator 140 may include a first bias voltage generation circuit M19.

The first bias voltage generation circuit M19 may generate the first bias voltage VB1 corresponding to a bias current IB. For example, the first bias voltage generation circuit M19 may include an NMOS transistor having a source terminal and a drain terminal connected between an input node of the bias current IB and the supply terminal of the low voltage and a gate terminal, the drain terminal and gate terminal being connected to an output terminal of the first bias voltage VB1.

Since the first buffer BFF1 receives the first bias voltage VB1, a switching control signal SWEN and a source control signal LP, which are global signals, the first buffer BFF1 may be designed as an isolation buffer to prevent a coupling effect with the other buffers BFF2 to BFFn. For example, the first buffer BFF1 may include a switch VSW and an inverter INV.

The switch VSW may selectively transfer the first bias voltage VB1 as the first bias signal VB<1> on the basis of the switching control signal SWEN. For example, the switching control signal SWEN may be activated during the auto-zero period, and be deactivated during the settling period and the comparison period. Accordingly, the switch VSW may isolate the first buffer BFF1 from the other buffers BFF2 to BFFn at least during the comparison period. The first bias signal VB<1> may be held by a parasitic capacitor (not illustrated), which is connected to an output terminal of the first bias signal VB<1>, during the settling period and the comparison period.

The inverter INV may invert the source control signal LP and output the first suppression control signal SC<1>.

The first comparison circuit AMP1 may include a first current source element M12, a second current source element M13, a first input element M14, a second input element M15, a first switch element TSW11, a second switch element TSW12, a first current sinking element M16, a second current sinking element M17 and a third current sinking element M18.

The first current source element M12 may be connected between the supply terminal of the high voltage and an output terminal O11 of the first comparison signal C1<1>. For example, the first current source element M12 may include a PMOS transistor having a gate terminal connected to an inverting output terminal O12 and a source terminal and a drain terminal connected between the supply terminal of the high voltage and the output terminal O11 of the first comparison signal C1<1>.

The second current source element M13 may be connected between the supply terminal of the high voltage and the inverting output terminal O12. For example, the second current source element M13 may include a PMOS transistor having a gate terminal connected to the inverting output terminal O12 and a source terminal and a drain terminal connected between the supply terminal of the high voltage and the inverting output terminal O12.

The first input element M14 may be connected between the output terminal O11 and a common node CC1. For example, the first input element M14 may include an NMOS transistor having a gate terminal receiving the first pixel signal P<1> and a source terminal and a drain terminal connected between the output terminal O11 and the common node CC1.

The second input element M15 may be connected between the inverting output terminal O12 and the common node CC1. For example, the second input element M15 may include an NMOS transistor having a gate terminal receiving the ramp signal VR and a source terminal and a drain terminal connected between the inverting output terminal O12 and the common node CC1.

The first switch element TSW11 may be connected between an input terminal of the first pixel signal P<1> and the output terminal O11. For example, the first switch element TSW11 may be shorted during an auto-zero period, and be open during the settling period and the comparison period.

The second switch element TSW12 may be connected between an input terminal of the ramp signal VR and the inverting output terminal O12. For example, the second switch element TSW12 may be shorted during the auto-zero period, and be open during the settling period and the comparison period.

The first current sinking element M16 may be connected between the common node CC1 and the supply terminal of the low voltage. The first current sinking element M16 may receive the first bias signal VB<1>, and generate the operating current having the low level corresponding to the first bias signal VB<1>. For example, the first current sinking element M16 may include an NMOS transistor having a gate terminal connected to the output terminal of the first bias signal VB<1> and a source terminal and a drain terminal connected between the common node CC1 and the supply terminal of the low voltage.

The second current sinking element M17 may be connected between the third current sinking element M18 and the supply terminal of the low voltage. The second current sinking element M17 may receive the first bias signal VB<1>. For example, the second current sinking element M17 may include an NMOS transistor having a gate terminal connected to the output terminal of the first bias signal VB<1> and a source terminal and a drain terminal connected between the third current sinking element M18 and the supply terminal of the low voltage.

The third current sinking element M18 may be connected between the common node CC1 and the second current sinking element M17. The third current sinking element M18 may receive the first suppression control signal SC<1>, and generate the operating current having the high level according to the first suppression control signal SC<1>. When the first suppression control signal SC<1> is activated, the operating current may increase while an additional current path is formed through the second and third current sinking elements M17 and M18. For example, the third current sinking element M18 may include an NMOS transistor having a gate terminal connected to an output terminal of the first suppression control signal SC<1> and a source terminal and a drain terminal connected between the common node CC1 and the second current sinking element M17.

Hereinafter, an operation of the image sensor 100 in accordance with an embodiment of the present disclosure, which has the above-described configuration, is described with reference to FIGS. 6 and 7.

Figure 6:
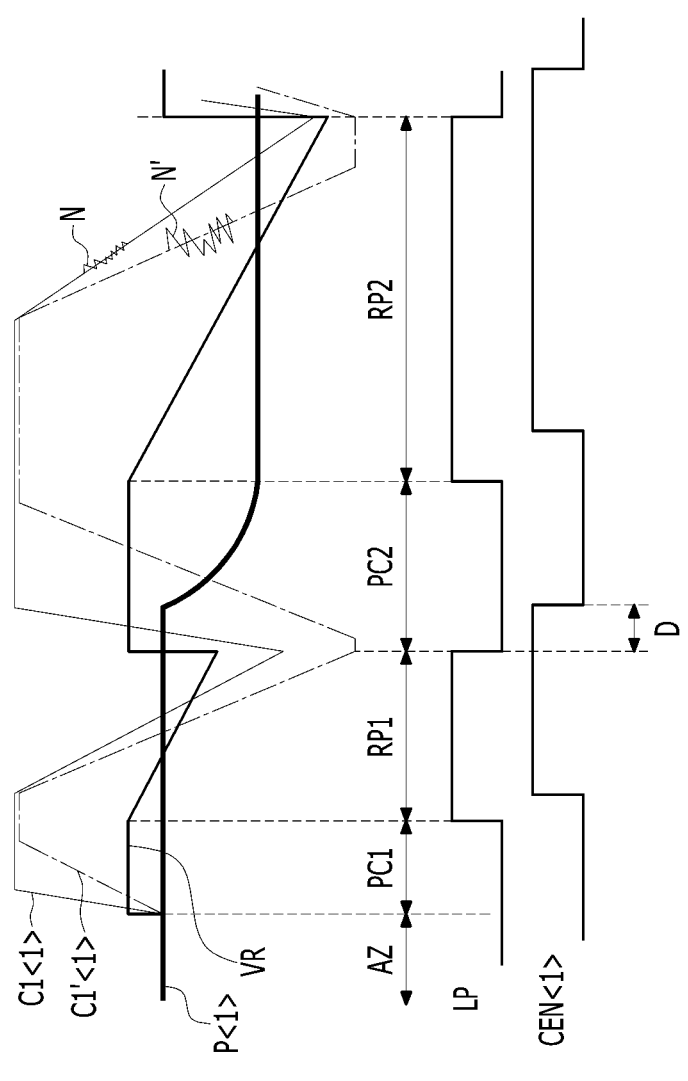
FIG. 6 is a timing diagram illustrating an operation of the image sensor illustrated in FIG. 1 in accordance with an embodiment of the present disclosure.

FIG. 6 is a timing diagram illustrating the operation of the image sensor 100 illustrated in FIG. 1 in accordance with an embodiment of the present disclosure. For example, FIG. 6 is the timing diagram representatively illustrating the first pixel signal P<1>.

Referring to FIGS. 1 to 6, one unit row period for reading out the first pixel signal P<1> may include an auto-zero period AZ, a first settling period PC1, a first comparison period RP1, a second settling period PC2 and a second comparison period RP2. The first settling period PC1 and the first comparison period RP1 may be periods for reading out a reset level of the first pixel signal P<1>, and the second settling period PC2 and the second comparison period RP2 may be periods for reading out a data level of the first pixel signal P<1>. The image sensor 100 may operate in the high-speed mode during the first and second settling periods PC1 and PC2, and operate in the low-power mode during the first and second comparison periods RP1 and RP2.

During the auto-zero period AZ, a voltage level of the first pixel signal P<1> and the voltage level of the ramp signal VR may be equally sampled.

During the first settling period PC1, the voltage level of the ramp signal VR may increase to a start level, and the voltage level of the first comparison signal C1<1> may increase to a predetermined target level, i.e., a logic high level, as the voltage level of the ramp signal VR becomes greater than the voltage level of the first pixel signal P<1>. In the image sensor 100 according to an embodiment of the present disclosure, the first comparison circuit AMP1 may rapidly settle the voltage level of the first comparison signal C1<1> to the target level by using the operating current having the high level.

During the first comparison period RP1, the first comparison circuit AMP1 may compare the first pixel signal P<1> having the reset level with the ramp signal VR ramping from the start level to a first end level which may be determined according to an allowable range of the reset level, and allow the first comparison signal C1<1> to transition from a logic high level to a logic low level when the comparison result indicates that the voltage level of the first pixel signal P<1> becomes equal to the voltage level of the ramp signal VR. In the image sensor 100 according to an embodiment of the present disclosure, the first comparison circuit AMP1 may operate with the low power by using the operating current having the low level. The first comparison circuit AMP1 may increase the output noise reflected in the output terminal of the first comparison signal C1<1> while reducing the input noise introduced through the first and second input terminals by operating with the low power. The noise suppression circuit NC may be enabled during the first comparison period RP1, and suppress the output noise reflected in the output terminal of the first comparison signal C1<1>. For example, the noise suppression circuit NC may suppress the output noise by reducing the bandwidth of the first comparison circuit AMP1. The bandwidth is described with reference to FIG. 7.

Figure 7:
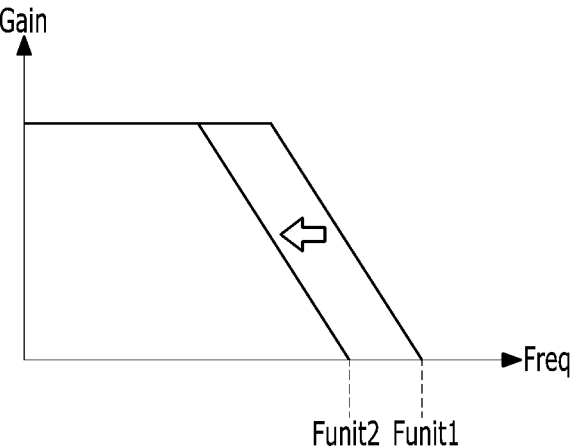
FIG. 7 is a graph illustrating a bandwidth of the first comparison circuit illustrated in FIG. 3 in accordance with an embodiment of the present disclosure.

FIG. 7 is a graph illustrating the bandwidth of the first comparison circuit AMP1 illustrated in FIG. 3 in accordance with an embodiment of the present disclosure.

Referring to FIG. 7, a horizontal axis may indicate a frequency 'Freq', and a vertical axis may indicate a gain 'Gain'. When the noise suppression circuit NC is disabled, the first comparison circuit AMP1 may have a relatively large first bandwidth Funit1, and when the noise suppression circuit NC is enabled, the first comparison circuit AMP1 may have a relatively small second bandwidth Funit2. This is described based on the following "Equations 1 and 2".

$$Funit1 = \frac{gm}{2\pi C1} \qquad \text{[Equation 1]}$$

$$Funit2 = \frac{gm}{2\pi(C1 + C2)} \qquad \text{[Equation 2]}$$

Herein, "gm" may be a transconductance of the transistor M9 or M10 included in the first comparison circuit AMP1, "C1" may be capacitance of the third sampling circuit CS13, and "C2" may be capacitance of the capacitor CC1 included in the noise suppression circuit NC (refer to FIGS. 3 to 5).

When the switch SW1 included in the noise suppression circuit NC is open, the first comparison circuit AMP1 may have a relatively large first bandwidth Funit1 according to the third sampling circuit CS13. On the other hand, when the switch SW1 included in the noise suppression circuit NC is shorted, the first comparison circuit AMP1 may have a relatively small first bandwidth Funit1 according to the third sampling circuit CS13 and the capacitor CC1 included in the noise suppression circuit NC.

Referring back to FIG. 6, during the second settling period PC2, the voltage level of the ramp signal VR may increase to the start level, and the voltage level of the first comparison signal C1<1> may increase to a predetermined target level, i.e., a logic high level, as the voltage level of the ramp signal VR becomes greater than the voltage level of the first pixel signal P<1>. In this case, the first comparison circuit AMP1 may rapidly settle the voltage level of the first comparison signal C1<1> to the target level by using the operating current having the high level.

During the second comparison period RP2, the first comparison circuit AMP1 may compare the first pixel signal P<1> having the data level with the ramp signal VR ramping from the start level to a second end level which may be determined according to an allowable range of the data level, and allow the first comparison signal C1<1> to transition from a logic high level to a logic low level when the comparison result indicates that the voltage level of the first pixel signal P<1> becomes equal to the voltage level of the ramp signal VR. In this case, the first comparison circuit AMP1 may operate with the low power by using the operating current having the low level. The first comparison circuit AMP1 may increase the output noise reflected in the output terminal of the first comparison signal C1<1> while reducing the input noise introduced through the first and second input terminals by operating with the low power. The noise suppression circuit NC may be enabled during the second comparison period RP2, and suppress the output noise reflected in the output terminal of the first comparison signal C1<1>.

The image sensor 100 according to an embodiment of the present disclosure may operate in a high-speed mode during the first settling period PC1 and the second settling period PC2, and operate in a low-power mode during the first comparison period RP1 and the second comparison period RP2. For example, the first comparison signal C1<1> may be a signal generated by the image sensor 100 according to an embodiment of the present disclosure, and a comparison signal C1'<1> corresponding to the first comparison signal C1<1> may be a signal generated by an image sensor according to the prior art. However, this is merely an example, and the present disclosure may not be limited thereto.

In the first and second settling periods PC1 and PC2, the first comparison signal C1<1> may be settled to the target level more rapidly than the comparison signal C1'<1>. In the first and second comparison periods RP1 and RP2, the magnitude of the output noise N of the first comparison signal C1<1> may be smaller than that of output noise N' of the comparison signal C1'<1>.

In the first and second comparison periods RP1 and RP2, as the bandwidth of the first comparison circuit AMP1 decreases, the first comparison signal C1<1> may be delayed. Therefore, the delay circuit DLY may delay the first count enable signal CEN<1> by the delay time D for which the first comparison signal C1<1> is delayed. The delay time D may be defined according to the following "Equation 3".

$$D = \frac{1}{Funit1 - Funit2} \qquad \text{[Equation 3]}$$

Herein, "Funit1" may be the first bandwidth (refer to "Equation 1"), and "Funit2" may be the second bandwidth (refer to "Equation 2").

According to an embodiment of the present disclosure, an operating current of a comparison circuit may be adjusted, which makes it possible to support a high-speed mode and a low-power mode, a voltage level of a comparison signal which is outputted from the comparison circuit in the high-speed mode, may be rapidly settled to a target level, a bandwidth of the comparison circuit may be reduced in the low-power mode, which makes it possible to suppress noise reflected in the comparison signal.

According to an embodiment of the present disclosure, a high-speed mode and a low-power mode may be supported according to a period when converting a pixel signal, which makes it possible to optimize power consumption.

Also, according to an embodiment of the present disclosure, noise occurring when converting the pixel signal in the low-power mode may be minimized.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure.

Various embodiments of the present invention have been illustrated and described. Although specific terminologies are used herein, they are used only in the descriptive sense. The present invention is not limited to or by any such term nor any of the above-described embodiments, as many variations are possible within the spirit and scope of the present invention. The present invention encompasses all such variations to the extent that they fall within the scope of the following claims. Furthermore, the embodiments may be combined to form additional embodiments.

What is claimed is:

1. An image sensor comprising:
a buffer circuit suitable for generating, based on at least one first signal, at least one second signal controlled during each of settling and comparison periods; and
a comparison circuit suitable for using an operating current having a relatively high level during the settling period and a relatively low level during the comparison period based on the second signal, and comparing a pixel signal with a ramp signal during the comparison period to generate a comparison signal,
wherein the buffer circuit includes:
a switch suitable for selectively transferring a bias voltage as a bias signal based on a switching control signal; and
an inverter suitable for inverting a source control signal and outputting a suppression control signal,
wherein the at least one first signal includes the switching control signal, the bias voltage and the source control signal, and
wherein the at least one second signal includes the bias signal and the suppression control signal.

2. An image sensor comprising:
a buffer circuit suitable for generating, based on at least one first signal, at least one second signal controlled during each of settling and comparison periods; and
a comparison circuit suitable for using an operating current having a relatively high level during the settling period and a relatively low level during the comparison period based on the second signal, and comparing a pixel signal with a ramp signal during the comparison period to generate a comparison signal,
wherein the buffer circuit includes:
a first driver connected between a supply terminal of a high voltage and an output terminal of a bias signal, and suitable for receiving a first bias voltage;

a second driver connected between the output terminal of the bias signal and a supply terminal of a low voltage, and suitable for receiving a second bias voltage;
a first inverter suitable for inverting a source control signal to generate a suppression control signal;
a second inverter suitable for inverting the suppression control signal to generate a driving control signal;
a third driver connected to the output terminal of the bias signal, and suitable for receiving the driving control signal; and
a fourth driver connected between the third driver and the supply terminal of the low voltage, and suitable for receiving the second bias voltage,
wherein the at least one first signal includes the first bias voltage, the second bias voltage and the source control signal, and
wherein the at least one second signal includes the bias signal.

3. The image sensor of claim 1,
wherein the comparison circuit includes:
a current sinking element connected between a common node and a supply terminal of a low voltage, and suitable for receiving a bias signal;
a first input element connected between the common node and an output terminal of the comparison signal, and suitable for receiving the pixel signal;
a second input element connected between the common node and an inverting output terminal, and suitable for receiving the ramp signal;
a first current source element connected between the output terminal and a supply terminal of a high voltage; and
a second current source element connected between the inverting output terminal and the supply terminal of the high voltage, and connected to the first current source element in a mirroring structure, and
wherein the at least one second signal includes the bias signal.

4. The image sensor of claim 1,
wherein the comparison circuit includes:
a first current sinking element connected between a common node and a supply terminal of a low voltage, and suitable for receiving a bias signal;
a second current sinking element connected to the supply terminal of the low voltage, and suitable for receiving the bias signal;
a third current sinking element connected between the second current sinking element and the common node, and suitable for receiving the suppression control signal;
a first input element connected between the common node and an output terminal of the comparison signal, and suitable for receiving the pixel signal;
a second input element connected between the common node and an inverting output terminal, and suitable for receiving the ramp signal;
a first current source element connected between the output terminal and a supply terminal of a high voltage; and
a second current source element connected between the inverting output terminal and the supply terminal of the high voltage, and connected to the first current source element in a mirroring structure, and
wherein the at least one second signal includes the bias signal and the suppression control signal.

5. The image sensor of claim 1, further comprising a noise suppression circuit connected to an output terminal of the comparison signal, and suitable for suppressing noise, which is applied to the comparison signal during the comparison period, based on the suppression control signal.

6. The image sensor of claim 5, wherein the noise suppression circuit includes:
a switch connected to the output terminal, and suitable for switching based on the suppression control signal; and
a capacitor connected between the switch of the noise suppression circuit and a supply terminal of a low voltage.

7. The image sensor of claim 5, wherein the at least one second signal includes the suppression control signal.

8. An image sensor comprising:
a comparison circuit suitable for comparing, based on a bias signal, a pixel signal with a ramp signal and outputting a comparison signal;
a noise suppression circuit connected to an output terminal of the comparison signal, and suitable for suppressing noise, which is applied to the comparison signal during a specific period, based on a suppression control signal;
a bias generation circuit suitable for generating a bias voltage; and
a buffer circuit suitable for generating the suppression control signal and the bias signal based on the bias voltage, a source control signal and a switching control signal.

9. The image sensor of claim 8, wherein the specific period includes at least one comparison period in which the ramp signal ramps.

10. The image sensor of claim 8, wherein the noise suppression circuit includes:
a switch connected to the output terminal, and suitable for switching based on the suppression control signal; and
a capacitor connected between the switch and a supply terminal of a low voltage.

11. The image sensor of claim 8, further comprising:
the bias generation circuit suitable for generating a first bias voltage and a second bias voltage; and
the buffer circuit suitable for generating the suppression control signal and the bias signal based on the first bias voltage, the second bias voltage and a source control signal.

12. The image sensor of claim 11, wherein the buffer circuit includes:
a first driver connected between a supply terminal of a high voltage and an output terminal of the bias signal, and suitable for receiving the first bias voltage;
a second driver connected between the output terminal of the bias signal and a supply terminal of a low voltage, and suitable for receiving the second bias voltage;
a first inverter suitable for inverting the source control signal to generate the suppression control signal;
a second inverter suitable for inverting the suppression control signal to generate a driving control signal;

a third driver connected to the output terminal of the bias signal, and suitable for receiving the driving control signal; and
a fourth driver connected between the third driver and the supply terminal of the low voltage, and suitable for receiving the second bias voltage.

13. The image sensor of claim 11, wherein the comparison circuit includes:
a current sinking element connected between a common node and a supply terminal of a low voltage, and suitable for receiving the bias signal;
a first input element connected between the common node and the output terminal, and suitable for receiving the pixel signal;
a second input element connected between the common node and an inverting output terminal, and suitable for receiving the ramp signal;
a first current source element connected between the output terminal and a supply terminal of a high voltage; and
a second current source element connected between the inverting output terminal and the supply terminal of the high voltage, and connected to the first current source element in a mirroring structure.

14. The image sensor of claim 8, wherein the buffer circuit includes:
a switch suitable for selectively transferring the bias voltage as the bias signal based on the switching control signal; and
an inverter suitable for inverting the source control signal and outputting the suppression control signal.

15. The image sensor of claim 8, wherein the comparison circuit includes:
a first current sinking element connected between a common node and a supply terminal of a low voltage, and suitable for receiving the bias signal;
a second current sinking element connected to the supply terminal of the low voltage, and suitable for receiving the bias signal;
a third current sinking element connected between the second current sinking element and the common node, and suitable for receiving the suppression control signal;
a first input element connected between the common node and the output terminal, and suitable for receiving the pixel signal;
a second input element connected between the common node and an inverting output terminal, and suitable for receiving the ramp signal;
a first current source element connected between the output terminal and a supply terminal of a high voltage; and
a second current source element connected between the inverting output terminal and the supply terminal of the high voltage, and connected to the first current source element in a mirroring structure.

* * * * *